(12) United States Patent
Tirén (10) Patent No.: US 10,636,647 B2
(45) Date of Patent: Apr. 28, 2020

(54) FIELD EMISSION LIGHT SOURCE ADAPTED TO EMIT UV LIGHT

(71) Applicant: LIGHTLAB SWEDEN AB, Uppsala (SE)

(72) Inventor: Jonas Tirén, Uppsala (SE)

(73) Assignee: LIGHTLAB SWEDEN AB, Uppsala (SE)

( * ) Notice: Subject to any disclaimer, the term of this patent is extended or adjusted under 35 U.S.C. 154(b) by 0 days.

(21) Appl. No.: 16/346,615

(22) PCT Filed: Nov. 28, 2017

(86) PCT No.: PCT/SE2017/051183
§ 371 (c)(1),
(2) Date: May 1, 2019

(87) PCT Pub. No.: WO2018/106168
PCT Pub. Date: Jun. 14, 2018

(65) Prior Publication Data
US 2019/0287786 A1    Sep. 19, 2019

(30) Foreign Application Priority Data
Dec. 8, 2016 (SE) .................................. 1651620

(51) Int. Cl.
*H01J 63/04* (2006.01)
*H01J 1/304* (2006.01)
(Continued)

(52) U.S. Cl.
CPC .............. *H01J 63/04* (2013.01); *C02F 1/325* (2013.01); *C09K 11/778* (2013.01);
(Continued)

(58) Field of Classification Search
CPC ............. H01J 63/04; H01J 1/304; H01J 19/24
(Continued)

(56) References Cited

U.S. PATENT DOCUMENTS

| 4,336,223 A | 6/1982 | Hillman |
| 6,389,970 B1 * | 5/2002 | Tashiro ................. B41C 1/1066 101/462 |

(Continued)

FOREIGN PATENT DOCUMENTS

| DE | 102010005893 | 7/2011 |
| WO | 9857344 A1 | 12/1998 |

(Continued)

OTHER PUBLICATIONS

Jüstel, T. et al., Temperature-dependent spectra of YPO4:Me (Me = Ce, Pr, Nd, Bi), Journal of Luminescence, vol. 106, 2004, pp. 225-233.

(Continued)

*Primary Examiner* — Christopher M Raabe
(74) *Attorney, Agent, or Firm* — RMCK Law Group, PLC (57) ABSTRACT

The present invention generally relates to a field emission light source and specifically to a field emission light source adapted to emit ultraviolet (UV) light. The light source has a UV emission member provided with an electron-excitable UV emitting material. The material is at least one of $LuPO_3$:$Pr^{3+}$, $Lu_2Si_2O_2$:$Pr^{3+}$, $LaPO_4$:$Pr^{3+}$, $YBO_3$:$Pr^{3+}$ and $YPO_4$:$Bi^{3+}$.

20 Claims, 6 Drawing Sheets

(51) Int. Cl.
*H01J 19/24* (2006.01)
*H01J 63/06* (2006.01)
*C09K 11/77* (2006.01)
*H01J 63/02* (2006.01)
*C02F 1/32* (2006.01)
*B82Y 30/00* (2011.01)

(52) U.S. Cl.
CPC ...... *C09K 11/7709* (2013.01); *C09K 11/7774* (2013.01); *C09K 11/7777* (2013.01); *H01J 1/304* (2013.01); *H01J 19/24* (2013.01); *H01J 63/02* (2013.01); *H01J 63/06* (2013.01); *B82Y 30/00* (2013.01); *C02F 2201/3223* (2013.01); *C02F 2303/04* (2013.01)

(58) Field of Classification Search
USPC .......................................................... 313/497
See application file for complete search history.

(56) References Cited

U.S. PATENT DOCUMENTS

| | | | |
|---|---|---|---|
| 6,447,721 | B1 | 9/2002 | Horton, III et al. |
| 8,946,993 | B2 | 2/2015 | Murnick et al. |
| 9,168,320 | B1* | 10/2015 | Wedding .................. A61L 2/10 |
| 9,288,885 | B2 | 3/2016 | Hu |
| 9,617,171 | B2 | 4/2017 | Rajagopalan et al. |
| 2005/0010249 | A1* | 1/2005 | Minamoto .......... A61N 5/0616 607/2 |
| 2007/0248487 | A1 | 10/2007 | Kay et al. |
| 2012/0168679 | A1* | 7/2012 | Huang .................... C08L 83/02 252/301.36 |
| 2014/0131619 | A1* | 5/2014 | Greuel ............... C09K 11/7701 252/301.4 P |
| 2019/0298879 | A1 | 10/2019 | Tirén |

FOREIGN PATENT DOCUMENTS

| | | |
|---|---|---|
| WO | 2008156813 A1 | 12/2008 |
| WO | 2009139908 A1 | 11/2009 |

OTHER PUBLICATIONS

PCT International Search Report and Written Opinion dated Jan. 23, 2018 for International Application No. PCT/SE2017/051183, 11 pages.

Gawande, A.B. et al., "Luminescence improvement in Pr3+ and Gd3+ activated Sr2MG(BO3)2 inorganic phosphor," Materials Research Bulletin 60: 285-291, 2014.

International Search Report and Written Opinion dated Sep. 22,2017 for PCT Application No. PCT/SE2017/050674, 13 pages.

Swedish Search Report dated Feb. 28, 2017 for Swedish Patent Application No. 1650889-7, 2 pages.

Kim, S. et al., "Using UVC Light-Emitting Diodes at Wavelengths of 266 to 279 Nanometers to Inactivate Foodborne Pathogens and Pasteurize Sliced Cheese," Applied and Environmental Microbiology, vol. 82, No. 1, Jan. 2016, pp. 11-17.

* cited by examiner

FIELD EMISSION LIGHT SOURCE ADAPTED TO EMIT UV LIGHT

CROSS-REFERENCE TO RELATED APPLICATIONS

This application is a 371 U.S. National Stage of International Application No. PCT/SE2017/051183, filed Nov. 28, 2017, which claims priority to Swedish Patent Application No. 1651620-5, filed Dec. 8, 2016. The disclosures of each of the above applications are incorporated herein by reference in their entirety.

TECHNICAL FIELD

The present invention generally relates to a field emission light source and specifically to a field emission light source adapted to emit ultraviolet (UV) light.

BACKGROUND OF THE INVENTION

An ultraviolet (UV) lighting system may for example be used for disinfection, curing of resins and many other applications. Most such UV lighting system comprises an UV light source using mercury as one of the active components. Alternatives exist, such as using costly Excimer lamps or possibly using UV LEDs. However, modern UV LEDs struggle with emission of UV light below 350 nm.

A further alternative to mercury based UV lighting is the use of field emission light source technology. Field emission is a phenomenon that occurs when a very high electric field is applied proximate to the surface of a conducting material. This field will give electrons enough energy such that electrons are emitted from the material.

An example of a field emission light source that may be adapted for UV light emission is disclosed in U.S. Pat. No. 9,288,885. In U.S. Pat. No. 9,288,885 a cathode is arranged in an evacuated chamber, having for example glass walls, wherein the chamber on its inside is coated with an anode electrically conductive layer. Furthermore, a light emitting layer is deposited on the anode. When a high enough potential difference is applied, between the cathode and the anode conductive layer, creating high enough electrical field strength, electrons are emitted from the cathode, and accelerated towards the anode. As the electrons strike the light emitting layer, typically comprising a light powder for example comprising a phosphor, will emit photons, a process referred to as cathodoluminescence. U.S. Pat. No. 9,288,885 discloses that the light emitting by the field emission light source preferably is white light but that also UV light may be emitted.

Even though U.S. Pat. No. 9,288,885 provides an interesting and alternative approach to mercury based UV lighting, no solution is given as how to achieve efficient UV light emission also below 350 nm. Thus, there is seems to be a need for further improvements in regards to UV lighting using field emission light source technology, specifically for implementations where UV light emission below 350 nm.

SUMMARY OF THE INVENTION

According to an aspect of the invention, the above is at least partly alleviated by a field emission light source adapted to emit UV light, comprising an evacuated chamber, the evacuated chamber comprising an UV light permeable portion, a field emission cathode comprising a plurality of nanostructures, the field emission cathode arranged within the evacuated chamber, an anode structure arranged within the evacuated chamber, and an UV emission member provided with an electron-excitable UV emitting material, the UV emission member arranged within the evacuated chamber, wherein the electron-excitable UV emitting material is adapted to emit UV light towards the UV emission member when a voltage is applied between the anode structure and the cathode, whereby electrons are emitted from the field emission cathode towards the anode structure, whereby UV light emitted by the UV emission member are at least partly emitted outside of the field emission UV light source through the UV light permeable portion, wherein the electron-excitable UV-emitting material is at least one of $LuPO_3$:$Pr^{3+}$, $Lu_2Si_2O_7$:$Pr^{3+}$, $LaPO_4$:$Pr^{3+}$, $YBO_3$:$Pr^{3+}$ and $YPO_4$:$Bi^{3+}$.

As stated above, in accordance to the present invention there is provided a field emission light source specifically adapted for UV light emission, comprising an UV-emitting material that has been identified by the inventor as specifically suitable for a field emission lighting application, where electrons emitted by the field emission cathode are directly converted to UV light by means of the above defined electron-excitable UV-emitting material. Several materials are known to convert higher energy photons to UV light, but such materials are typically not suitable for use in a field emission lighting application, applying direct electron to UV conversion.

Furthermore, in comparison to known field emission based UV lighting applications, the above defined specifically selected types of electron-excitable UV-emitting material have been concluded to have a high durability, to have a suitable life time and relatively good efficiency. In accordance to the present invention, the UV light is adapted to have a wavelength at least partly below 350 nm and preferably below 320 nm, more preferably as low as 240 nm. However, it is in some embodiments desirable not to emit radiation below 240 nm as at such wavelengths are sometimes not desirable and even banned in some countries, for example Germany, for the use in disinfection of drinking water.

Preferably, the UV emission member is arranged adjacently to the anode structure, or alternatively provided as part of the anode structure. The implementation will thus be dependent on the application at hand. As understood from the above, the UV light will accordingly typically be reflected by the UV emission member towards the UV light permeable portion and then out from the UV light source. Thus, the UV emission member may be integrated with the anode structure (functioning as one of the electrodes of the field emission light source), or similarly provided in close adjacency to the anode structure.

In an embodiment, the anode structure comprises an electrically conductive layer arranged to at least partly cover the electron-excitable UV-emitting material in a direction towards the field emission cathode. The electrically conductive layer will in this configuration effectively increase the lifetime of the electron-excitable UV-emitting material since it may reduce charging of the UV-emitting material and also improve heat distribution and transport from the UV-emitting material. However, the electrically conductive layer should be thin enough, so that electrons, impacting on the anode will pass through the layer without losing any significant portion of the energy; if that happens this energy will not be converted into photons and is lost resulting in overall reduced energy efficiency.

There are two preferred metals for this layer, namely Ag (Silver) and Al (Aluminum). Of the two the latter is lower cost, a lighter element (allowing for thicker layers, thus easier to deposit in a uniform manner over relatively large surfaces) and has high reflectance for UV light and is easier to implement as its oxide is thin. In an embodiment a thickness of the aluminum layer is selected to be more than 50 nm, preferably between 60-110 nm.

In accordance to the invention, the nanostructures preferably comprise at least one of ZnO nanostructures and carbon nanotubes. The plurality of ZnO nanostructures is adapted to have a length of at least 1 um. In another embodiment the nanostructures may advantageously have a length in the range of 3-50 μm and a diameter in the range of 5-300 nm.

Preferably, the UV light permeable portion comprises at least one of Quartz, fused silica, UV transparent borosilicate and UV transparent soft glass. Such materials are suitable due to their inherent transparency to UV light.

The electron energy used for consumer applications should be less than 10 kV and preferably less than 9 kV or soft X-rays generated by Bremsstrahlung will be able to escape the lamp (it is otherwise absorbed by the anode glass). However these levels are to some extent depending on glass thickness, thus higher voltages can be allowed if a thicker glass is used.

On the other hand the electron energy must be high enough to penetrate the conductive and reflecting layer as discussed above. A preferred range for consumer applications is thus 7-9 kV and 7-15 kV for industrial applications (where some soft X-rays can be accepted).

The evacuated chamber needs to be under partial vacuum so that the electrons emitted from the cathode may transit to the anode with only a small number of collisions with gas molecules. Frequently the evacuated space may be evacuated to a pressure of less than $1\times10^{-4}$ Torr. The getter member preferably comprises is a deposit of reactive material that is provided for completing and maintaining the vacuum within the evacuated chamber. It may be suitable to include a getter member to be electrically connected to the field emission cathode.

In some embodiments of the present disclosure, the evacuated chamber may be formed as an elongated tube, wherein for example a first and a second end portion of the elongated tube is correspondingly sealed with glass plugs. The getter member may in such an embodiment be arranged at the end plug arranged at the first end portion of the elongated tube. As an alternative, the end plug at the first end portion may comprise a stem portion and the getter member is arranged at the stem portion of the end plug. Alternatively, especially common when using quartz or fused silica, the evacuated chamber is pinched in order to close the chamber.

Preferably, the field emission light source may be arranged as a component of a disinfection system, as will be elaborated below. The disinfection system may for example be adapted for treating a fluid, surfaces or gaseous media. The expression "fluid" used in the context of the invention should also be interpreted broadly and may include any type of fluid needed to be disinfected, e.g. water.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 2 shows a diagram with a reflectance curve for a conductive layer, FIG. 3 there is conceptually illustrates a system for treating a fluid, comprising a field emission UV light source as shown in FIG. 1, and FIG. 4a-f illustrate different emission spectra resulting from different phosphor material and their corresponding germicidal de-activation curves.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
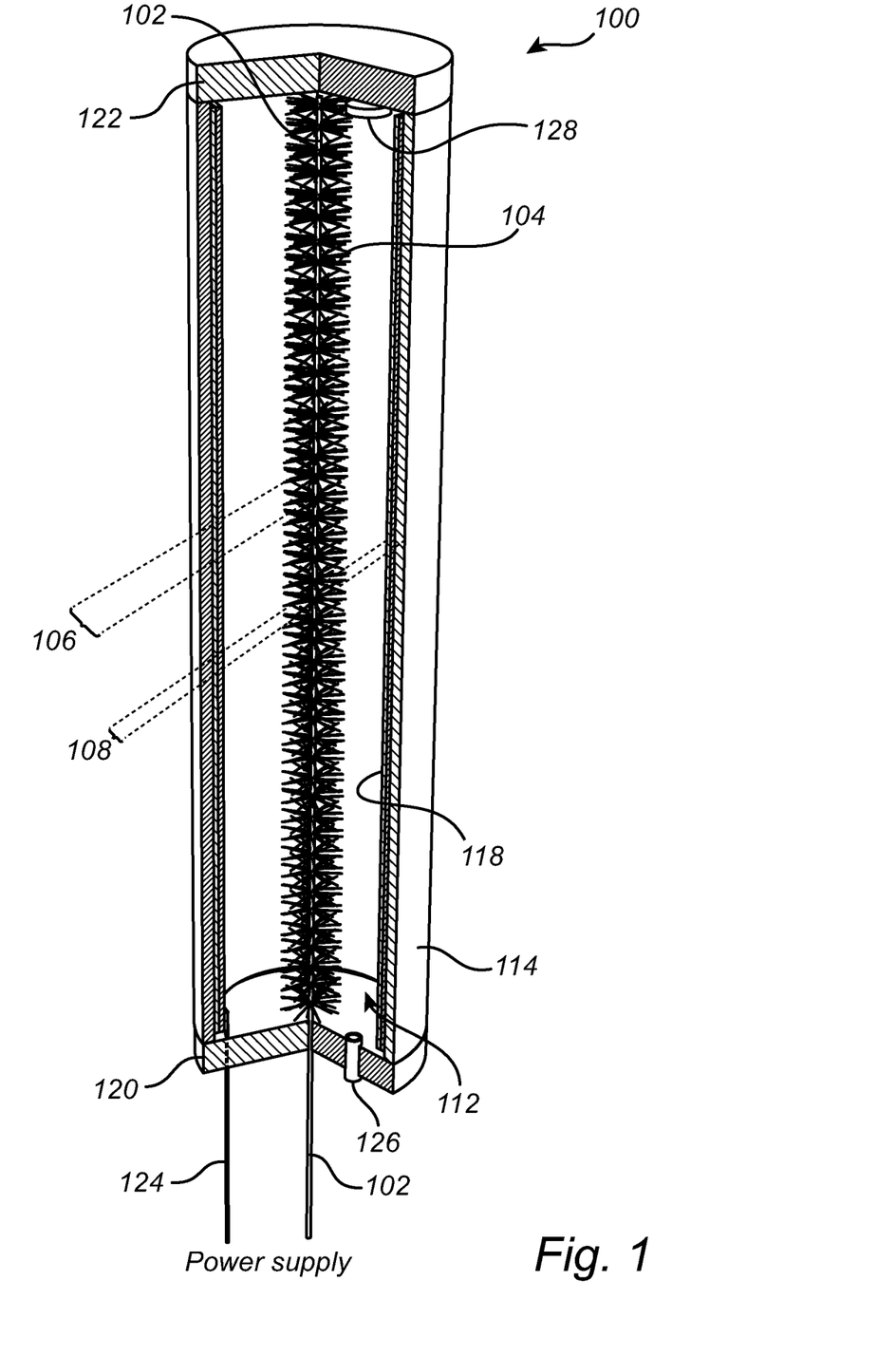
FIG. 1 illustrates a perspective view of a field emission UV light source according to a currently preferred embodiment of the invention.

Referring now to the drawings and to FIG. 1 in particular, there is illustrated a tubular field emission light source 100 according to a preferred embodiment of the invention. The field emission light source 100 comprises a wire 102 provided with a plurality of ZnO nanostructures 104 having a length of at least 1 um, the wire 102 and plurality of ZnO nanostructures 104 together forming a field emission cathode 106. In a possible embodiment the ZnO nanostructures 104 may be selectively arranged onto spaced protrusions (not shown). It may also, as an alternative, be possible to substitute the ZnO nanostructures 104 for carbon nanotubes (CNT, not shown). Other emitter materials are equally possible and within scope of the invention.

The field emission light source 100 further comprises an anode structure 108 arranged in vicinity of the field emission cathode 106. The cavity 112 formed between the field emission cathode 106 and the anode structure 108 is evacuated, thereby forming a vacuum between the field emission cathode 106 and the anode structure 108.

The anode structure 108 comprises a UV transparent material 114 such a as Quartz, fused silica, UV transparent borosilicate (for example Schott 8337B) or a UV transparent soft glass (such as Philips PH160). Other transparent materials are equally possible and within the scope of the invention. Examples of such materials are MgF2 and sapphire.

The transparent structure 114 is in turn provided with a layer of a material 116 capable of conversion of electron energy to UV photons, hereinafter referred to as a phosphor. Examples of such materials are $LuPO_3:Pr^{3+}$, $Lu_2Si_2O_7:Pr^{3+}$, $LaPO_4:Pr^{3+}$, $YBO_3:Pr^{3+}$ and $YPO_4:Bi^{3+}$. Other similar materials may be equally feasible.

In order to achieve a complete electrical circuit and at the same time allow the UV photons to exit the light source, a thin conductive layer 118 is deposited on top of the phosphor layer 116. Aluminum is selected has a relatively light atomic mass, which means that electrons of even relatively low kinetic energy may pass through the Aluminum film to a large extent. Aluminum also has a high reflectance to UV. As the electrons that pass the Aluminum film impact on the UV emitting phosphor, the emitted photons will be radiated in all directions. In order not to have additional losses of absorption of the generated photons inside the light source structure, the Aluminum layer also acts like a mirror. In order to have a high reflectance—and act as a good mirror—the Aluminum thickness must typically be larger than 50 nm. In addition the Aluminum will improve heat transport. Heat is mainly generated close to the surface of the phosphor, i.e. close to the Aluminum layer. Thus the function of this layer is threefold.

An alternative material to Aluminum is silver (Ag). However silver has a higher atomic mass and will thus impede the electrons to a larger extent. Other conductive materials may be used but most have penalties in either reflectivity of UV radiation or higher atomic mass or both.

In order to close the cavity and maintain the vacuum the tube 100 is plugged in the end with glass plugs 120, 122. These glass plugs 120, 122 must not necessarily be UV transparent and also serve as containing the electrical feed through needed to establish an external contact between the anode (specifically the conductive layer 118 and the connector 124) and the wire 102 of the cathode 106. In the illustration of FIG. 1, the wire 102 and the connector 124 is shown to extend outside of at the lower end of the tube shaped field emission light source 100. It should however be understood that the wire 102 and/or the connector 124 also or instead may extend outside of at the upper end of the tube shaped field emission light source 100.

In addition one of the end plugs, such as the end plug 122, may contain a tube 126 which is used to evacuate the cavity 112 to vacuum level. Once the cavity 112 is evacuated the tube 126 is fused shut by heat. Such end plugs 120, 122 are commonly used for ordinary fluorescent lamp, the main requirement being the thermal properties of the material must be similar to that of the UV transparent material 114 and fused together using relatively high temperatures. Thus, a large difference in the respective thermal coefficients of expansion will cause stress and even cracking.

To achieve and especially to sustain a vacuum of $1 \times 10^{-4}$ Torr or better, it is highly desirable to use a getter 128. The getter may be mounted onto one of the end plugs, such as end plug 124. A typical getter may be SP777 by SAES Getters of Italy.

The energy used for consumer applications should be less than 10 kV and preferably less than 9 kV or soft X-rays generated by Bremsstrahlung will be able to escape the lamp (it is otherwise absorbed by the anode glass). However these levels are to some extent depending on glass thickness, thus higher voltages can be allowed if a thicker glass is used.

On the other hand the energy must be high enough to penetrate the conductive and reflecting layer. A preferred range for consumer applications is thus 7-9 kV and 7-15 kV for industrial applications (where some soft X-rays can be accepted). Preferably, a DC signal (direct current) is used for driving the field emission light source 100; however in some embodiment also an AC (alternating current) signal may be applied. During operation of the field emission light source 100, a power supply (not shown) for generating a voltage within the above defined range is applied to the wire 102 and the connector 124.

The operating energy (operating voltage) is primarily set by the nanostructure detailed geometry (height, width/minimum radius, distance) and the geometry of the light source 100 and the distance between the cathode 106 and the anode 108.

Figure 2:
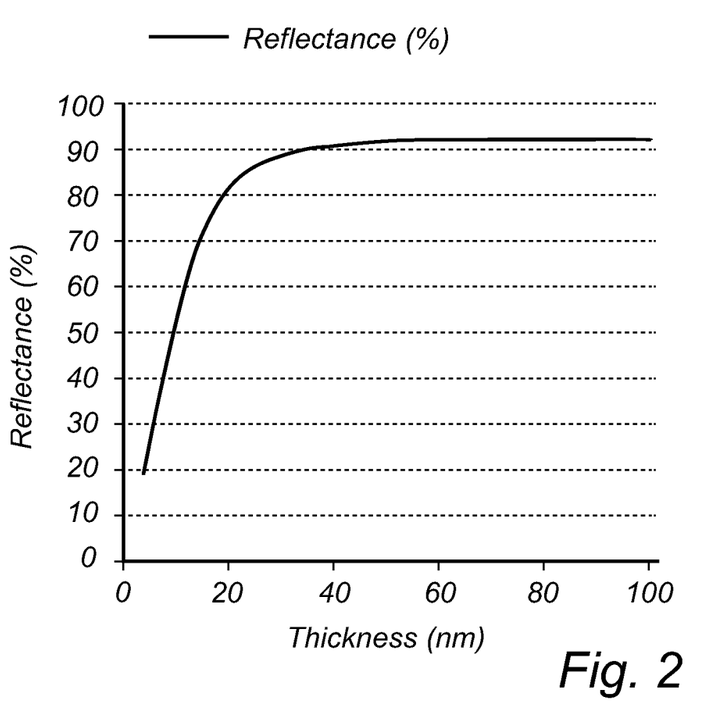

For Aluminum the thickness of the reflective and electrically conductive layer is determined to be in the range of 50-100 nm. A reflectance curve is shown in FIG. 2. As can be seen the reflectance reaches its steady maximum value above 50 nm. Allowing for some thickness variation over the surface a target value should be set to 60-70 nm as the low end and 90-110 nm as the high end, all depending on the exact desired operating voltage, in turn determined by the application.

It should be noted that higher operating voltages may be beneficial since, using a given input power requirement, a higher voltage leads to lower current densities. The current density is directly related to the intensity degeneration of the phosphor through, where a subjected accumulated charge is considered the primary cause for this degeneration. A secondary benefit of using a higher energy is that the efficiency usually increases with higher voltages, likely because the photons are generated deeper into the cathodoluminescent crystallite and a lower fraction of electrons (especially secondary electrons) reach the surface of the crystallite where a non-radiative recombination process will occur.

Figure 3:
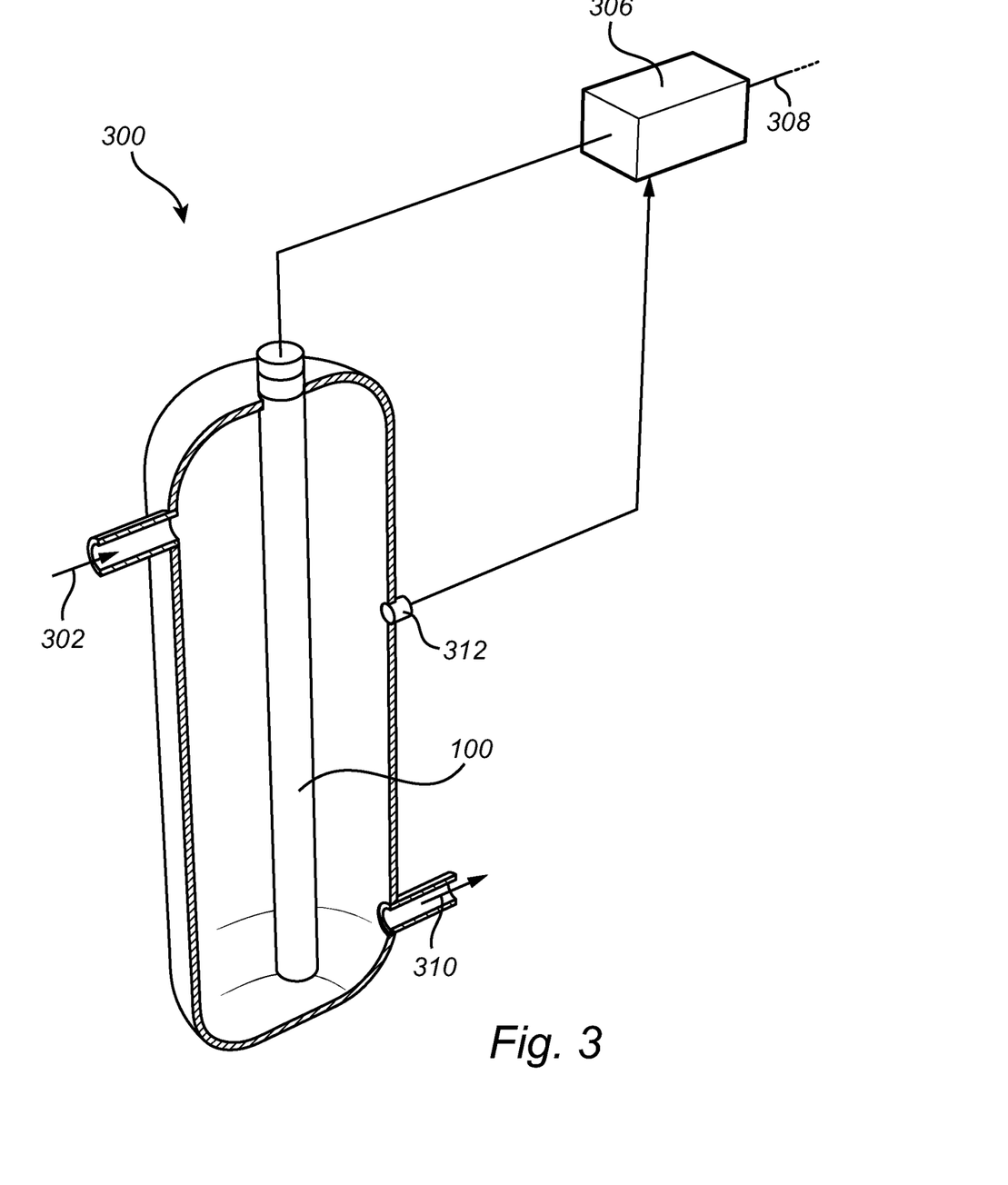

Turning finally to FIG. 3, illustrating a possible implementation comprising the tubular field emission light source 100. Specifically, in FIG. 3 there is illustrated a fluidic UV disinfection system 300 shown in cross sectional view. It should be noted that the complete system usually may contain filters of different kinds as well as other components. Here only the UV disinfection section is described. The field emission UV light source 100 as discussed above may be provided as the dedicated (or one of a plurality of) UV light source of the system 300.

A fluid, such as water, enters the disinfection tube through the inlet 302 into a container arranged to receive an amount of the fluid. The field emission light source 100 is turned on and energized by an electronic drive unit 306. The disinfection tube may in some embodiment comprise various structures or means to provide a turbulent flow in order to further ensure that all organisms are being subjected to an as large amount of UV radiation as possible, such structures and means also not shown. The electronic drive unit 306 is in turn connected to a power supply 308, such as a wall electrical outlet or similar. The electronic power supply may further be integrated with the disinfection tube or the light source. The water passes the UV light source 100 and exits through an outlet 310. The UV intensity may be monitored by an UV sensor 312, connected to the electronic drive unit 306 which is safeguarding the system for adequate UV intensity to ensure adequate disinfection. The electronic drive unit 306 may further control a variable valve (not shown), thus controlling the flow rate by using the UV intensity to determine its maximum value. Further sensors may comprise temperature and pressure (not shown here).

It should be understood that it in some embodiments may be possible to combine the UV light source 100 within the fluidic UV disinfection system 300, allowing for further improved fluidic treatment. Furthermore, other applications may be possible making use of the UV field emission light source 100, including for example air disinfection, surface disinfection, curing of glues etc., are equally possible and the system implementations described are equally valid. It is also obvious to the skilled person that scaling and different combinations of the described implementations are straightforward. As an example, the figures are showing light sources of similar size and shape for practical reasons, but they may in fact have completely different sizes as well as different form factors. Furthermore, there may be additional light sources in such systems.

Turning now to FIGS. 4a-4f, providing examples of results of use of the exemplary disinfection system shown in FIG. 3 for de-activation of E. coli. Note that all measured de-activation curves show the relative reduction as function of UV dose in order to be comparable, thus the vertical axis shows the logarithm of the ratio between the remaining concentration of E. coli in Colony Forming Units per milliliter (CFU/ml)—denoted N—the initial concentration before irradiation, denoted No, thus denoted log(N/No).

Figure 4A:
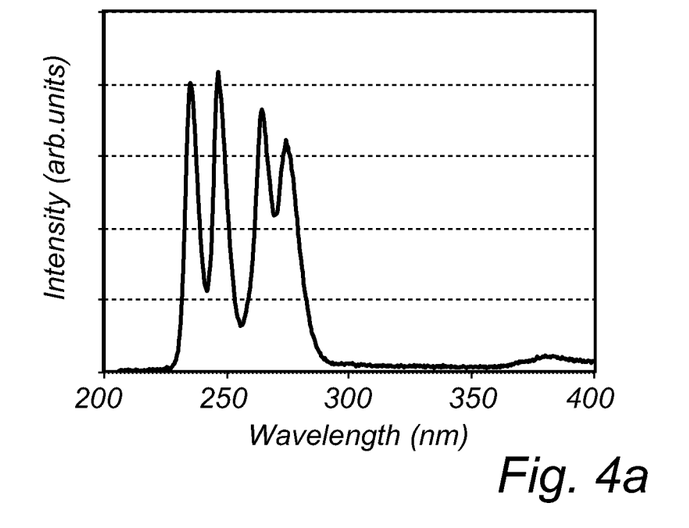
Figure 4B:
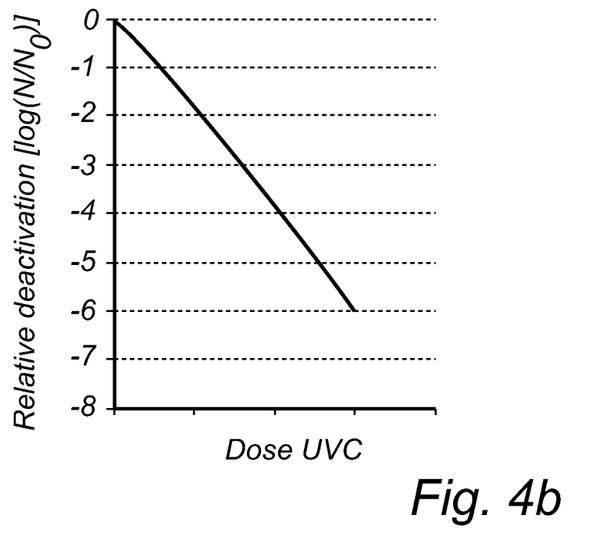

In FIG. 4a, the emission spectra from an UVC field emission light source provided with a first phosphor material (light powder) for UV light emission is provided. In FIG. 4a, the phosphor material has been selected to be a $LuPO_3:Pr^{3+}$ phosphor material (or equivalent). In FIG. 4b, the corresponding de-activation curve is shown, for disinfection of water, where no significant tailing is visible.

Figure 4C:
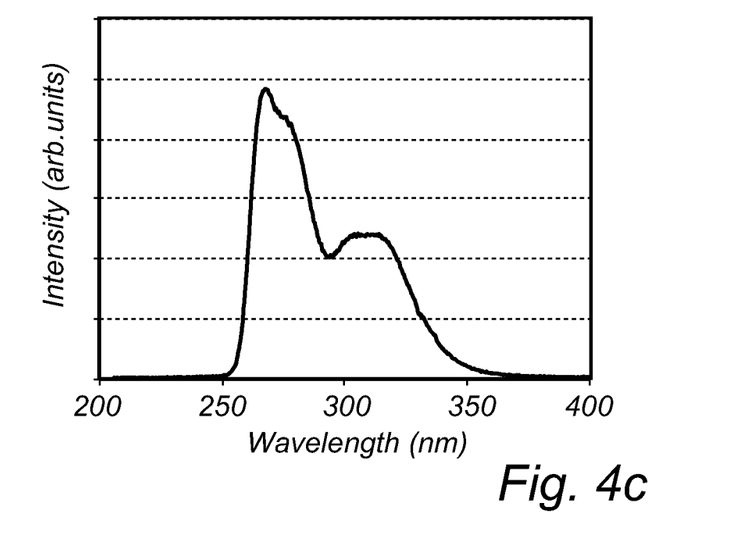
Figure 4D:
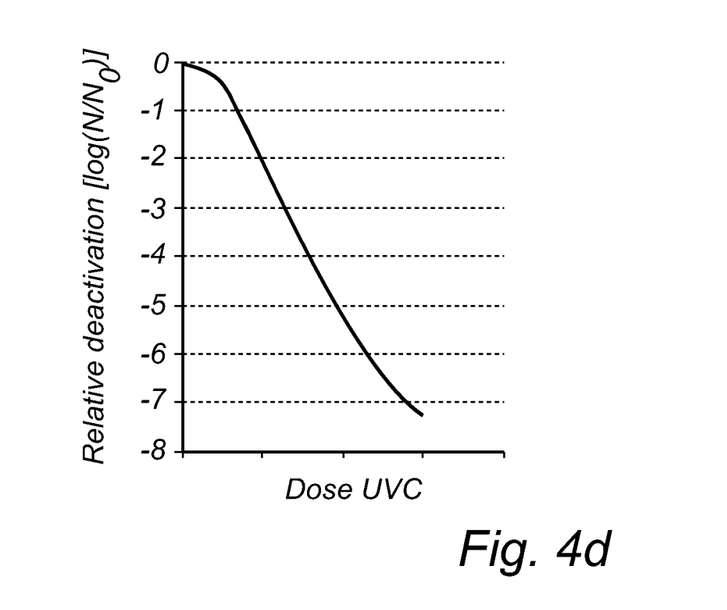

In FIG. 4c, a second phosphor material in the form of a $Lu_2Si_2O_7:Pr^{3+}$ phosphor material is used, and FIG. 4d shows the corresponding de-activation curve. As may be seen, in FIG. 4d, a de-activation of almost 8 orders of magnitude has been achieved, i.e. 99.999999% of the bacteria have been de-activated.

Figure 4E:
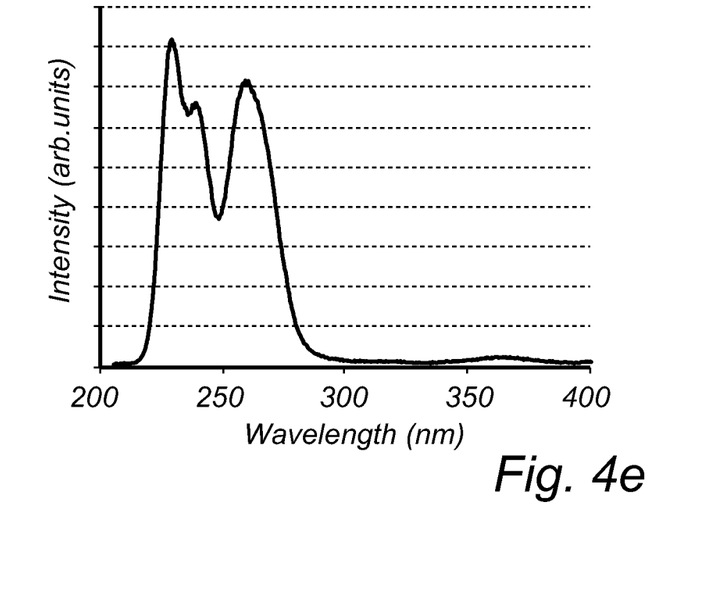
Figure 4F:
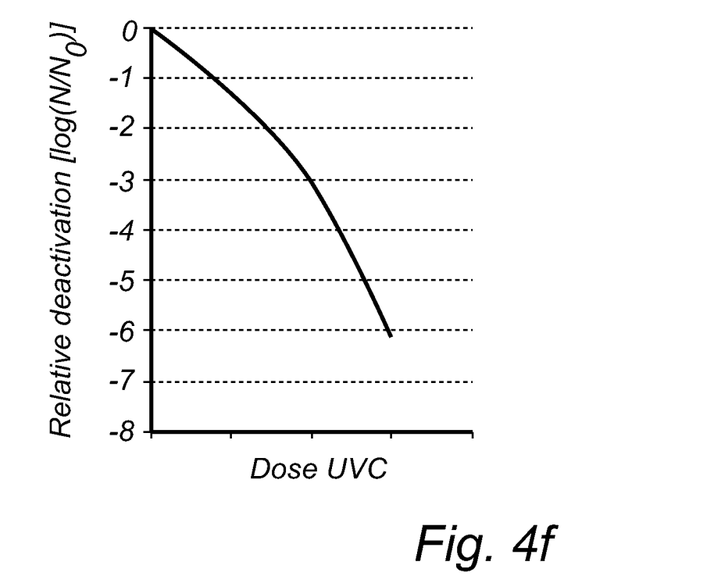

Turning finally to FIGS. 4e and 4f, where a third phosphor material in the form of a $LaPO_4:Pr^{3+}$ phosphor material is used and the corresponding de-activation curve is shown, respectively. The further disclosed electron-excitable UV-emitting material $YBO_3:Pr^{3+}$ and $YPO_4:Bi^{3+}$ provides similar results as shown in FIGS. 4a-4f.

In summary, the present invention relates to a field emission light source adapted to emit UV light, comprising an evacuated chamber, the evacuated chamber comprising an UV light permeable portion, a field emission cathode comprising a plurality of nanostructures, the field emission cathode arranged within the evacuated chamber, an anode structure arranged within the evacuated chamber, and an UV emission member provided with an electron-excitable UV emitting material, the UV emission member arranged within the evacuated chamber, wherein the electron-excitable UV emitting material is adapted to emit UV light towards the UV emission member when a voltage is applied between the anode structure and the cathode, whereby UV light emitted by the UV emission member are at least partly emitted outside of the field emission UV light source through the UV light permeable portion, wherein the electron-excitable UV-emitting material is at least one of $LuPO_3:Pr^{3+}$, $Lu_2Si_2O_7:Pr^{3+}$, $LaPO_4:Pr^{3+}$, $YBO_3:Pr^{3+}$ and $YPO_4:Bi^{3+}$.

In accordance to the present invention there is provide a field emission light source specifically adapted for UV light emission, comprising an UV-emitting material that has been identified by the inventor as specifically suitable for a field emission lighting application. In comparison to known field emission based UV lighting applications, the above defined specifically selected types of electron-excitable UV-emitting material have been concluded to have a high durability, to have a suitable life time and high luminous efficacy.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A field emission light source adapted to emit UV light, comprising:
   an evacuated chamber, the evacuated chamber comprising an UV light permeable portion,
   a field emission cathode comprising a plurality of nanostructures, the field emission cathode arranged within the evacuated chamber;
   an anode structure arranged within the evacuated chamber; and
   an UV emission member provided with an electron-excitable UV emitting material, the UV emission member arranged within the evacuated chamber, wherein the electron-excitable UV emitting material is adapted to emit UV light towards the UV emission member when a voltage is applied between the anode structure and the cathode, whereby UV light emitted by the UV emission member are at least partly emitted outside of the field emission UV light source through the UV light permeable portion, wherein the electron-excitable UV-emitting material is at least one of $LuPO_3:Pr^{3+}$, $Lu_2Si_2O_7:Pr^{3+}$, $LaPO_4:Pr^{3+}$, $YBO_3:Pr^{3+}$ and $YPO_4:Bi^{3+}$.

2. The field emission light source according to claim 1, wherein the UV light permeable portion comprises at least one of Quartz, fused silica, UV transparent borosilicate and UV transparent soft glass.

3. The field emission light source according to claim 1, wherein the nanostructures comprises at least one of ZnO nanostructures and carbon nanotubes.

4. The field emission light source according to claim 3, wherein the plurality of ZnO nanostructures is adapted to have a length of at least 1 um.

5. The field emission light source according to claim 1, wherein the UV emission member is arranged adjacently to the anode structure.

6. The field emission light source according to claim 1, wherein the UV emission member is part of the anode structure.

7. The field emission light source according to claim 6, wherein the anode structure comprises an electrically conductive layer arranged to at least partly cover the electron-excitable UV-emitting material in a direction towards the field emission cathode.

8. The field emission light source according to claim 7, wherein the electrically conductive layer is reflective to UV light.

9. The field emission light source according to claim 7, wherein the electrically conductive layer comprises an aluminum layer.

10. The field emission light source according to claim 9, wherein a thickness of the aluminum layer is more than 50 nm, preferably between 60-110 nm.

11. The field emission light source according to claim 7, wherein the electrically conductive layer comprises a silver layer.

12. The field emission light source according to claim 1, wherein a voltage level applied between the field emission cathode and the anode structure is selected to be between 5-15 kV, preferably less than 10 kV and most preferably between 5-8 kV.

13. The field emission light source according to claim 1, wherein a vacuum level within the evacuated chamber is below $1 \times 10^{-4}$ Torr.

14. The field emission light source according to claim 1, wherein the evacuated chamber is formed as an elongated tube.

15. The field emission light source according to claim 14, wherein a first and a second end portion of the elongated tube is correspondingly sealed with glass plugs.

16. The field emission light source according to claim 1, further comprising a getter member.

17. The field emission light source according to claim 15, further comprising a getter member arranged at the end plug arranged at the first end portion of the elongated tube.

18. The field emission light source according to claim 17, wherein the end plug at the first end portion comprises a stem portion and the getter member is arranged at the stem portion of the end plug.

19. The field emission light source according to claim 16, wherein the getter member electrically connected to the field emission cathode.

20. A disinfection system comprising a field emission light source according to claim 1.

* * * * *